United States Patent [19]

Van Eenam

[11] 4,145,248

[45] Mar. 20, 1979

[54] AIR DRYING PROCESS

[75] Inventor: Donald N. Van Eenam, Des Peres, Mo.

[73] Assignee: Monsanto Company, St. Louis, Mo.

[21] Appl. No.: 841,863

[22] Filed: Oct. 13, 1977

[51] Int. Cl.$^2$ .................. D21D 3/00; C07C 43/00
[52] U.S. Cl. .................. 162/168 R; 162/164 EP; 568/616; 568/614; 260/348.48; 260/567.6 P; 260/606.5 F; 260/607 B
[58] Field of Search ........ 162/164 R, 164 EP, 168 R, 162/168 N, 169, 168 NA; 260/615 B

[56] References Cited

U.S. PATENT DOCUMENTS

| | | | |
|---|---|---|---|
| 2,884,057 | 4/1959 | Wilson | 162/164 R |
| 3,261,874 | 7/1966 | Stogryn | 260/615 B |
| 3,417,060 | 12/1968 | Breslow | 162/164 EP |
| 3,519,559 | 7/1970 | Quinlan | 260/615 B |
| 3,562,102 | 2/1971 | Gaertner | 162/168 R |

*Primary Examiner*—Joseph Scovronek
*Assistant Examiner*—C. Konkol
*Attorney, Agent, or Firm*—David Bennett; William J. Farrington; James C. Logomasini

[57] ABSTRACT

Polymers comprising a plurality of adjacent activated unsaturations and which are hydrophilic are particularly useful as wet and dry strength improvers for cellulosic substrates.

22 Claims, No Drawings

AIR DRYING PROCESS

The present invention relates to air-drying polymers and specifically to hydrophilic polymers that can be applied to fibrous substrates and cured by air at comparatively low temperatures.

BACKGROUND OF THE INVENTION

In conventional paper making operations, cellulosic fibers are dispersed in water, drained on a wire screen, pressed into close physical contact and dried. The resulting paper sheet is formed of individual fibers which are held together by hydrogen bonds which give strength to the dry sheet. When the dry sheet is wet, these hydrogen bonds are broken and the paper loses most of its strength.

Good wet strength properties are particularly important in many paper products such as napkins, paper towels, household tissues, disposable hospital wear, bed sheets, and other products that are likely to come into contact with water. To prevent this loss of strength when the paper comes into contact with water, various chemical treatments have been employed in the paper making process. Among the most successful treatments is the use of synthetic resins, which when added to the cellulosic fibers either before or after a sheet of paper is formed and three-dimensionally cured or polymerized, can significantly increase the wet strength of the paper sheet.

Of these synthetic resins, urea formaldehyde and melamine formaldehyde-type resins are commonly used even though these types of resins are frequently cured under acidic conditions which are not only corrosive to the paper making equipment but also tend to embrittle the resultant paper. In addition, these resins are sometimes slow to cure and only belatedly develop wet strength characteristics. Polymers based on the reaction of epichlorohydrin with polyaminoamide or polyamine prepolymers which thermoset upon heating are also widely used in the paper industry. Generally, such polymers are added to the suspension of paper making fibers before the water laid web is formed. The polymers are electrostatically exhausted onto the fibers of the substrate and to a limited extent translocate to the fiber cross-over points. When the polymer is cured the cross-over points are held tightly together, even when wet, giving the substance an enhanced resistance to tensile stress both when wet and dry.

The ease with which the polymer can become localized around the cross-over points is often a crucial factor in its effectiveness as a wet-strength improver. This can easily be adversely affected by the solvent used and by viscosifiers used to modify the flow properties of the polymer.

The polymers may be cured by heating or by natural aging. These processes are often time-consuming and can result in incomplete cures without full development of wet-strength.

Prior art wet strength additives also often have the disadvantage that they are sensitive to pH and to the moisture content of the dried sheet and to other electrostatically charged additives. Also a reactive thermoset functionality is often subject to hydrolysis and other functional-group-destroying reactions and this can clearly lead to detrimental effects such as reduced capacity to strengthen the substrate upon which it is deposited. As a result, the conditions under which they are applied to the sheet must be carefully controlled and often the use of some desirable additive is precluded by the effect it has on the wet strength additive.

Although the wet strengthening agents of the prior art will provide acceptable paper products of improved wet strength, it can be seen that there are certain attendant difficulties in the use of these wet strengthening agents. As an example, when wet strength agents are added to the cellulosic fibers in suspension, the broke or salvage from the paper making operation is generally recycled by repulping and these wet strength agents may not permit the papermaking fibers to redisperse in the beater, so providing a paper product of poor quality.

It is surprisingly found, however, that when the resins of the present invention are used to improve the wet and dry strength of paper, many of the disadvantages of the prior art products are overcome. The resins of the present invention readily migrate to fiber cross-over points for maximum effectiveness on curing and cure rapidly under neutral, acidic or alkaline conditions often without the need for prolonged heating, so reducing delays in the development of wet and dry strength characteristics.

It has also been found that the polymers of the present invention are very versatile in that they can also be used on fibrous materials such as cloth to impart permanent crease characteristics, soil-resistance, handle and the like. They are largely insensitive to the presence of other additives in the solution in which it is applied, giving much greater flexibility to the way they may be used. They can easily be made cationic so that they can readily be exhausted onto cellulosic substrates. The molecule can be tailored to yield softness or a harder "handle" as desired, making them suitable for a very wide range of uses.

The polymer can also be modified in its viscosity by a simple air treatment (sometimes referred to as "bodying"), before application, thus permitting the polymer's physical characteristics to be optimized before application to any desired substrate. The use of aqueous solutions or emulsions of the additive reduces any solvent interference with the ease with which the polymer, once deposited on the cellulosic fibers, translocates to the fiber cross-over points before curing.

Thus, the polymers of the present invention provide a very useful and flexible tool for improving the properties of a wide range of fibrous substrates.

STATEMENT OF THE INVENTION

The present invention provides a hydrophilic polymer having a backbone comprising at least one segment with the formula:

where A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either $\alpha,\beta$ or $\beta,\gamma$ to the activating group, n is the number of adjacent (as the term is hereinafter defined) segments having this formula, and n and m are integers and are each at least 1, provided that where one is less than 4 the other is at least 4.

The polymers of the invention can have a plurality of adjacent segments of the above formula and by "adjacent" is meant that they are directly connected through a carbon-carbon bond or are indirectly connected through a

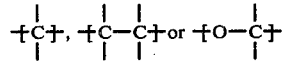

group or an oxygen or sulfur atom.

The effectiveness of the polymers of the present invention depends to a large extent on the provision of a plurality of activated double bonds in blocks which are spatially closely related. These double bonds are sites at which oxygen-initiated crosslinking takes place during the drying or accelerated or natural aging operation. Thus, the provision of blocks of activated double bonds each of which can provide a bond site, increases the potential crosslink density as well as the structural strength of the crosslinks that form both inter- and intra- molecularly during drying and/or aging.

The double bonds are activated, by which is meant that by virtue of their proximity in the polymer molecule to other strongly electron-donating groups they are more ready to form crosslinks during the air drying process. Examples of such electron-donating groups include ether, sulfide, hydroxyl, carboxyl, and olefinically unsaturated groups. The preferred electron-donating group is an ether group.

The crosslinking mechanism by which the polymers of the invention react to produce a structure capable of conferring substantial wet and dry strength on a paper substrate is similar to that by which many paints based on so-called "drying oils" form a hard tough skin when they dry. Such paints may contain one or more hydrophobic triglyceride esters of various unsaturated fatty acids and "drying" occurs by reaction of an oxygen molecule with one or more intralinear unsaturation to form a peroxide-type bridge between the two unsaturated sites. The more unsaturation there is in the acid, the more rapidly does drying occur. The best are derived from acids with multiple conjugated unsaturations. The crosslinking occurs both intra- and intermolecularly.

As has been indicated earlier, it is necessary that the polymer be hydrophilic. Certain of the suitable polymers are completely soluble in water. This may be achieved by the choice of the backbone compound but it may also be the result of the selection of an appropriate molecular ratio of backbone compound to the reactant affixing the pendant unsaturation to the backbone. Alternatively, the introduction of highly water-solubilizing groups such as quaternary ammonium, sulfonium, phosphonium, isothiouronium and other similar cationic groups or the incorporation of a plurality of ether oxygen atoms can be used to achieve water solubility or emulsifiability.

The description of the polymer as "hydrophilic" is therefore, to some extent, a reflection of the ratio of oxygen to carbon in the polymer. Generally, the greater the ratio the more hydrophilic is the polymer. However, hydrophilicity is best observed by the behavior of water placed on a fibrous surface that is normally absorbant (i.e. which is unmodified with additives that would destroy its porosity) that has been treated with the polymer. A hydrophobic polymer such as a drying oil-based paint causes the water to run off or form discrete droplets on the fibrous surface which, in effect, is waterproofed. A hydrophilic polymer on the other hand, allows the surface to become wetted and, if of a porous material, allows the water to be absorbed into the material by a "wicking" effect. This property is of course, highly desirable when the product treated with the polymer of the invention is a paper product where improved wet and dry strength are desirable characteristics.

Qualitatively therefore, the term "hydrophilic" polymer is understood to describe a polymer that can be applied to an unmodified cellulosic substrate without causing water applied to the treated substrate to run off or form discrete droplets. In other words, the polymer does not destroy the power of the substrate to absorb water or to be wetted by it.

Quantitatively it is found that hydrophobic polymers have a surface energy of about 40 dynes or less (water has a surface energy of 72 dynes). "Hydrophilic" polymers suitable for imparting wet/dry strength to cellulosic substrates, have a surface energy of at least 50 and an unmodified cellulosic substrate treated therewith has a surface energy of at least 65 dynes.

The polymers of the present invention can be formed by the reaction of a compound having an activated double bond and epoxy group with a molecule having a plurality of active hydrogen-containing groups selected from alcoholic hydroxyl, thiol, amide and carboxylic acid but not primary amine groups. Since it is also desirable that the polymer be hydrophilic it is often preferred that hydroxyl groups should provide the active hydrogen-containing groups. The polymer should not contain primary or secondary amine groups or phenolic hydroxyl groups since such groups interfere with the drying reaction.

The polymers of the present invention can for example, be prepared by the reaction of a backbone compound having at least one and preferably from 1 to 6 moieties containing active hydrogen-containing groups with a compound containing both an epoxide group and an activated double bond in proportions such that from 1 to 20 epoxide radicals are provided for each active hydrogen-containing groups on the backbone compound and the polymer produced has at least one block of at least four adjacent activated double bonds.

Alternatively, a polymer chain having a plurality of adjacent pendant hydroxyl groups can be reacted with, for example, allyl chloride using the techniques of Williamson's ether synthesis. Alternatively, the same Williamson synthesis technique may be employed using a polymer chain with pendant halogen atoms and an unsaturated alcohol such as allyl alcohol. This results in the generation of adjacent allyloxy groups pendant from the polymer backbone that can form a suitable block of unsaturation conferring the desired air-drying characteristics on the polymer.

Yet another method by which the polymer of the present invention may be prepared is by the Lewis acid promoted polymerization of vinyl allyl ether. This reaction is selective to the vinyl group and results in a chain of carbon atoms with an allyloxy group pendant from every other carbon atom.

There are, therefore, two basic types of polymer embraced by the formulation above. The first type comprises a backbone molecule with as little as one moiety containing an active hydrogen-containing group which is reacted with a compound containing an epoxy group and an activated terminal double bond in proportions such that there are at least four and preferably from 4 to 10 or even 20 epoxy groups per active hydrogen-containing group. As a simple example the polymer obtained by reacting 1 mole of glycol with 8 moles of allyl glycidyl ether produces a polymer having the average structure

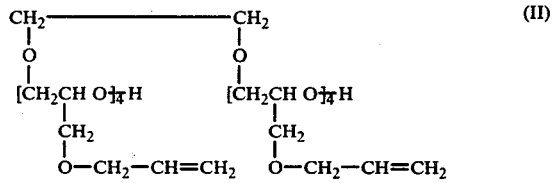

— thus providing two blocks of four adjacent allylic groups — assuming of course, uniform addition at both sides. In this compound the moiety A in formula (I) is —O— and the moiety E is

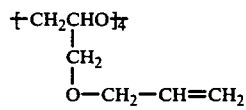

and has the double bond $\beta$, $\gamma$ to the activating oxygen group.

The other type of structure is obtained for example, when a backbone molecule which comprises at least four adjacent active hydrogen-containing groups is reacted with an unsaturated epoxy compound as described above or alternatively, using Williamson's ether synthesis, with allyl chloride to produce a block of pendant allylic groups. In this case the ether oxygen provides the activation for the double bond in the allyl group and also the group "A." An example of such a product is that produced by the reaction of allyl chloride with polyglycidol to produce a polymer having structure with repeating units of the formula

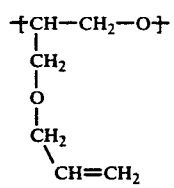

Here the moiety A in formula (I) is $\{CH_2O\}$, the moiety E is $\{CH_2-CH=CH\}$ and m is 1 and n is at least 4, the olefinic unsaturation is $\beta$, $\gamma$ to the activating oxygen.

The backbone compound can therefore, be a polymeric polyol such as polyethylene glycol, polyglycerol, polyglycidyl, polyvinyl alcohol, a partially hydroxyzed polyvinyl acetate, a styrene/allyl alcohol copolymer, poly(2-hydroxyethyl acrylate), poly(vinyloxyethanol), a monomeric polyol such as sorbitol, mannitol, or ethylene glycol; a monomeric alcohol such as allyl alcohol, the corresponding thiols; and dicarboxylic acids such as fumaric acid, maleic acid, malonic acid and phthalic acid. Also, compounds containing a mixture of radicals can be used such as hydroxy acids, which are compounds containing the carboxyl and hydroxyl radicals, hydroxy amides, hydroxy ethers, hydroxy esters, and the like. However, polyhydric alcohols having from 2 to 6 carbon atoms are preferred and sorbitol is especially preferred.

The epoxy compound reacted with the backbone compound comprises an epoxide group and an activated double bond.

The epoxy compounds that can be used have the general formula

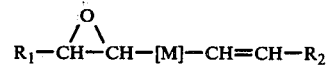

wherein M is absent or is a group capable of activating the double bond such as for example the following —CH$_2$—CH=CH—,

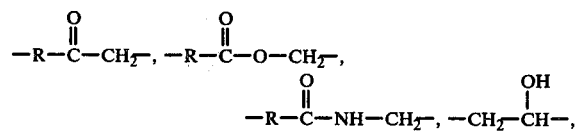

—CH$_2$—O—, —CH$_2$—S—, —CH$_2$—O—CH$_2$—, and —CH$_2$—S—CH$_2$—, wherein R is a C$_1$ to C$_4$ alkylene group and R$_1$ and R$_2$ are each hydrogen or C$_1$ to C$_4$ alkyl groups. The corresponding episulfides may also be used.

It is important that the activating group does not comprise a moiety that will inhibit or deactivate the air-curing mechanism. Such disfavored groups include free primary and secondary amine, phenolic hydroxyl and aldehyde groups.

Preferred compounds include allyl glycidyl ether, sorbyl glycidyl ether, butadiene monoxide and vinyl cyclohexene monooxide. The most preferred reactant which is also readily available at relatively low cost is allyl glycidyl ether.

One particularly preferred feature is the use of an allyl glycidyl ether reaction product obtained by the reaction of a small excess of epichlorohydrin with allyl alcohol. The allyl glycidyl ether reaction product has the empirical formula:

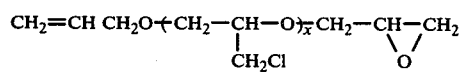

where x is a fraction up to 0.5, usually about 0.25.

It is preferred that the above reaction product is dried before use such that it contains less than 0.1% by weight of water which would otherwise give rise to undesirable side reactions.

This preferred feature is not confined to the specific allyl glycidyl ether reaction products described above. Expressed more generically, preferred polymers of the invention that can be produced using such products have the formula:

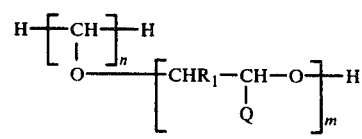

wherein n is an integer which is preferably from 2 to 6; m is an integer which is preferably from 6 to 10 with the proviso that where either of m or n is less than 4 the other is at least 4; $R_1$ is hydrogen or a $C_1$ to $C_4$ alkyl group; and Q is a moiety with the empirical formula:

where g is a fraction up to 0.5; Y is halogen or, in the event the halogen has been replaced by a quaternary group, an ammonium, phosphonium or sulphonium radical and $R_2$ is hydrogen or a $C_1$ to $C_4$ alkyl group.

The product of the reaction between the halogen-containing allyl glycidyl ether reaction product and the active hydrogen-containing backbone compound will therefore have a number of pendant —$CH_2Cl$ groups which may be reacted with a tertiary amine such as trimethylamine to form a quaternized amine derivative and therefore, a number of cationic charges on the polymer molecule. This makes the application to cellulosic substrates more efficient and permits "wet end" addition of the additive, that is, the polymer can be exhausted onto pulp fibers while dispersed before they are formed into a sheet, rather than applied to the finished substrate sheet.

The number of quaternary groups introduced into the polymer need not be enough to render it water-soluble. Often a relatively modest amount is enough to improve the dispersibility of the polymer in aqueous solutions even to the extent of leading to complete emulsification of the polymer when simply hand shaken with water.

An alternative method of introducing the quaternary group is to form a derivative of the hydroxyl group at the end of a chain of polymerized glycidyl groups that can be converted to a quaternary group. For example, an epoxy group can be formed thereon and this may then be condensed with a tertiary amine to produce a quaternary ammonium group with the same general result as has been determined above.

The reaction of the epoxy compound with the backbone molecule can take place under the influence of an acid catalyst, preferably a Lewis base such as boron trifluoride, antimony pentafluoride, tin tetrachloride, phosphorus pentafluoride, zinc fluoborate or anhydrous hydrogen fluoride. Alternatively, but less preferably, a Lewis acid such as sodium hydride or potassamide can be used. The temperature at which the reaction is performed is generally from 0° to 120° C. and preferably from 50° to 80° C.

The polymers of the present invention may contain minor quantities of cyclic and other homopolymeric species besides the polymers described above. These by-products are not usually formed in quantities sufficient to affect the utility of the product but they tend to increase when greater quantities of the epoxide are used. Since such conditions also tend to increase the efficiency of the polymer as an air-drying wet strength agent, a balance is struck between the competing mechanisms. For this reason, the ratio of epoxy groups (or equivalency) to active hydrogen-containing groups (or equivalency) on the backbone compound can be from 1 to 20 under the broad range of composition structures embraced by the invention. Where the backbone has a limited number of active hydrogen-containing groups, say up to 6, the preferred ratio is from 4 to 8 and especially about 5 or 6 to 1.

Air-drying of the polymers of the present invention is much accelerated by the presence of traces of heavy metal salts including for example, cobalt acetate, cobalt octoate, manganese acetate and other organic salts of transition metals known to be capable of functioning as "metallic driers" in the paint field. Organic peroxides such as benzoyl peroxide and similar hydroperoxides are also found to be effective either alone or in conjunction with the metallic driers described above.

The incorporation of from 0.001 to 0.01% by weight of such a salt to the fibrous substrate, along with the polymer is a preferred feature of the present invention.

The polymers of the present invention can be applied either as aqueous solutions or emulsions in water using a suitable surfactant which may be anionic, cationic or non-ionic in nature. The polymers are suitably applied as solutions in a water/alcohol mixture such as a $CH_3OH/H_2O$ mixture in volume ratios of 95:5 to 40:60. The preferred solvents have a methanol:water ratio of from 80:20 to 50:50.

The polymer can be applied as a spray in a concentration of 0.2 to 50% and preferably from 0.5 to 20% by weight and the polymer pick-up by the fibrous substrate is usually around 100%. The amount of polymer applied depends largely on the characteristics to be imparted to the substrate. In practice, however, excellent wet and dry strength paper is produced if the polymer is added at a rate of from 5 to 50 and preferably about 10 to 30 kilos per metric ton of the substrate.

As explained above, if the polymer is modified by the incorporation of quaternary ammonium, or other cationic groups, the polymer may be added to a fiber pulp, i.e., at the wet end of a paper making process. This is often a preferred manner of using the polymers to improve wet strenth of a paper and is particularly suited to the polymers of the present invention in view of their insensitivity to the other components commonly present at the wet end in a paper making process.

Often it is desirable that the viscosity of a polymer solution be increased (or "bodied") prior to addition to the substrate. With the present invention this is very easily accomplished merely by passing air through the polymer itself or a solution or emulsion of the polymer so as to initiate the air-drying reaction. By careful control of the amount of air used an exact modification of the polymer viscosity can be achieved. This avoids the need for viscosifiers which tend to reduce the ease with which the polymer can translocate to the polymer cross-over points before cure. Air treatment also is effective in reducing very substantially the time needed to achieve a cure of the polymer after it has been applied to the substrate.

DESCRIPTION OF THE PREFERRED EMBODIMENTS

This invention is now particularly described with reference to the following Examples which set forth methods of preparing the polymers of the present invention and deomonstrate the utility of such products as wet and dry strength additives in the manufacture of paper sheets.

The polymers prepared in the Examples were tested for wet and dry strength. This was done by applying the polymer to a #Whatman #1 circular filter paper sheet 12.5 cm. in diameter. A strip approximately 12.70 cm long and 2.54 cm wide was cut in the machine direction for each such treated sheet. The strip was then water wetted for about 10 seconds before being mounted in an Instron Tensile Tester (Model No. TM-L) and tested by T.A.P.P.I. method T-456 M-49.

Dry strength was determined by T.A.P.P.I. method T-404 OS-61.

EXAMPLE 1

This Example describes the preparation of a polymer according to the invention in which the backbone molecule is allyl alcohol.

A 300 ml. four-necked flask equipped with stirrer, thermometer, condenser adapted to prevent air-flow into the flask and an addition funnel was charged with 11.6 grams (0.2 moles) of allyl alcohol and 0.50 ml. of boron trifluoride-etherate as catalyst. The temperature in the flask was raised, with stirring, to 70° C. and maintained at this level. Allyl glycidyl ether (159.7 grams or 1.40 moles) was then added dropwise over a period of 4 hours. At 2.5 hours the addition of the allyl glycidyl ether was briefly stopped, the reaction mixture cooled to 25° C. and a further 0.30 ml. of the catalyst was added. The reaction mixture was then reheated to 70° C. and addition of the allyl glycidyl ether recommenced. Following completion of the addition the clear viscous solution was stirred for a further hour at 70° C. and then allowed to cool to room temperature.

The mixture was then treated with ether and water to extract all hydrogen fluoride and boric acid resulting from catalyst decomposition. The ethereal extract was then dried over sodium sulfate over-night.

Upon separation from the ether solvent it was found that 166.2 grams of a pale yellow, slightly viscous liquid product had been obtained, representing 97% of the theoretical yield.

EXAMPLE 2

This Example describes the production of a polymer according to the invention using polyethylene glycol as the backbone.

The process of Example 1 was repeated with the difference that the reactants were: 20.0 grams (0.05 mole or 0.10 equivalent of hydroxyl group) of Carbowax 400—a commercial polyethylene glycol, 114.1 grams (1.0 mole) of allyl glycidyl ether and 0.5 ml of the catalyst with late addition of a further 0.2 ml at 3.5 hours.

After extraction and purification the yield was found to be 126.2 g. of a pale yellow, slightly moderately viscous liquid, representing a yield of 94.1% of the theoretical. The oil was soluble in a 2:1 methanol/water mixture.

EXAMPLE 3

A solution obtained by adding 44.1 grams (1.0 mole) of condensed ethylene oxide to 57.1 grams (0.50 mole) of allyl glycidyl ether was placed in an ice-packed addition funnel attached to a 200 ml round bottomed flask which was also fitted with a dry ice condenser, a thermometer and a stirrer. The flask contained 20 grams (0.05 mole or 0.10 equivalents of hydroxyl) of Carbowax 400, the polyethylene glycol used in Example 2, and 0.50 ml. of a boron trifluoride etherate catalyst. The flask was heated to 75° C. and slow, dropwise addition of the ethylene oxide/allyl glycidyl ether from the funnel was begun. The reaction which was moderately exothermic was continued at 75° C. over a period of four hours with constant stirring except that after 80% of the solution in the dropping funnel had been added the reaction mixture was cooled to 25° C. and a further 0.2 ml. of the catalyst was added.

When the addition of the material in the dropping funnel was complete the temperature was maintained at 75° C. for a further 0.5 hour before being allowed to cool to room temperature.

Ether was added to the cooled solution along with about 10 ml. of a 10% aqueous solution of sodium hydroxide to destroy the catalyst. Dry ice was then added to convert any residual sodium hydroxide to the bicarbonate. The ether extract was then dried over sodium sulfate for two days.

After filtration and distillation to remove the solvent and residual volatiles 121.2 grams of a bright yellow oily product were obtained representing a yield of 88.6% of the theoretical. The water soluble product had a cloud point (as a 1% aqueous solution) of 28°–30° C.

EXAMPLE 4

This Example resembles Example 2 except that the polyethylene glycol is the one available commercially as "Carbowax 1000."

The reaction is performed in the manner described in Example 1 using 50 grams (0.05 mole) of Carbowax 1000 and 114.1 grams (1.0 mole) of allyl glycidyl ether. The reaction temperature was 77°–78° C. or slightly higher than was used in Example 1.

Upon completion of the reaction the product was separated and purified in the manner described in Example 3. 147.4 Grams of a yellow, fairly fluid oil were obtained representing a yield of 89.8% of theoretical. A one percent aqueous solution of the product had a cloud point of about 5° to 7° C., consequently the turbidity increases further on warming to 20° C.

EXAMPLE 5

In this Example the backbone compound is provided by ethylene glycol monomer.

A 300 ml. round bottom flask, equipped as described in Example 1, was charged with 4.06 grams (0.075 mole or 0.15 equivalent or hydroxyl) of ethylene glycol and 0.50 ml. of a boron trifluoride etherate catalyst. The flask was heated to about 77°–78° C. and addition of 171.2 grams (1.50 mole) of allyl glycidyl ether dropwise through the funnel was begun. After half the allyl glycidyl ether had been added (2 hours later) the reaction mixture was cooled to 20° C. and a further 0.30 ml. of the catalyst was added.

Two drops of the resin at this stage (in 1.5 ml. of methanol and with one drop of 1% cobalt acetate), added to an 11 cm filter paper circle and dried at 120° C. for 7 minutes gave a paper with good wet strength.

The temperature was then raised to 77°–78° C. again and addition of the allyl glycidyl ether was recommenced. The addition was completed in a further 2 hours and the mixture was maintained at from 78° to 80° C. for an extra half-hour thereafter.

The reaction mixture was treated as described in Example 3 and yielded 173.6 grams of a pale yellow, slightly to moderately viscous oil representing a yield of 98.7% of theoretical.

EXAMPLE 6

This Example duplicates Example 5 except that a different ratio of ethylene glycol to allyl glycidyl ether is used. In this Example 9.32 grams (0.15 mole or 0.30 equivalents of hydroxyl) of ethylene glycol was used and the amount of the initial catalyst charge was 0.60 ml. The process of Example 5 was used in all other respects.

The product was 179.9 grams of a pale yellow, slightly turbid oil representing a yield of 99.7% of theoretical.

EXAMPLE 7

In this Example the backbone compound is ethylene glycol but the ether is an allyl glycidyl ether reaction product prepared by the reaction of one mole of allyl alcohol with 1.25 mole of epichlorohydrin in the presence of a boron trifluoride etherate catalyst followed by dehydrohalogenation of the product with sodium hydroxide. The ether reaction product obtained has the empirical formula:

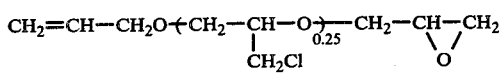

and is obtained in essentially quantitative yield. It was thoroughly dried before use.

The apparatus used in the production of the polymer of the invention is as described in Example 1. The flask was charged with 3.9 grams of ethylene glycol (0.0625 mole) and 0.50 ml. of a boron trifluoride etherate catalyst and heated to 77°–78° C. The crude ether (171.6 grams or 1.25 mole) was added dropwise to the glycol over a period of 6 hours. A further charge of 0.30 ml. of the catalyst was added after 2 hours in the manner described in Example 1. The reaction mixture was maintained at 77°–78° C. for a further half-hour after completion of the addition of the crude ether.

The product was separated and purified in the manner described in Example 3, and 171.4 grams of a yellow, moderately viscous oil was obtained representing a yield of 97.7% of theoretical.

EXAMPLE 8

This Example describes the production of a polymer of the invention in which the backbone molecule is sorbitol.

The apparatus used in Example 1 was charged with 9.11 grams 80.05 mole) of powdered anhydrous sorbitol followed by 0.30 ml. of boron trifluoride etherate as catalyst. The temperature of the flask was slowly raised to 95° C. at which temperature the sorbitol was a liquid. The slow dropwise addition of 171.2 grams (1.50 mole) of allyl glycidyl ether was begun and after about 10 ml. has been added the reaction mixture cleared. The reaction temperature was the graduallly reduced to about 80° C.

After about one third of the allyl glycidyl ether had been added, the addition was stopped, the reacted mixture cooled to room temperature and a further 0.2 ml. of the catalyst was added. The temperature was then raised to about 80° C. and addition of the allyl glycidyl ether was recommenced. This procedure was repeated after about two-thirds of the ether had been added.

Addition of the allyl glycidyl ether was completed in about 5 hours after which the reaction was continued for a further half-hour at the reaction temperature before being allowed to cool. The reaction mixture was moderately viscous and was worked up and purified in the manner described in Example 3.

The product obtained was 180.2 grams of a very pale, straw colored, slightly opalescent oil which was rather viscous at room temperature. This yield was virtually quantitative.

EXAMPLE 9

This Example described the production of a polymer of the invention using sorbitol as the backbone molecule and the crude ether described in Example 7.

The procedure followed was that of Example 8 with the exception that the molar quantities of sorbitol and the crude ether were halved (to 0.025 mole, or 4.55 grams, and 0.75 mole or 103 grams, respectively). Also, the catalyst charges were 0.20 ml. (initially) and two subsequent charges of 0.10 ml.

The total crude ether addition time was 3.0 hours and reaction was continued for a half-hour before the mixture was allowed to cool.

A yield of 105.8 grams (98.6% of theoretical) of a clear yellow moderately viscous oil were obtained. This product was much less viscous than the similar product from Example 8.

EXAMPLE 10

This Example sets forth the results obtained when papers treated with the polymers obtained in Examples 1 to 9 are treated for wet strength. The results are set forth in Table I below. The values quoted are averaged from four separate readings and are in gm/cm at the application level indicated which is measured in kilos of polymer per metric ton of paper treated. For the sake of comparison an untreated paper which had merely been wetted with water was also treated.

The polymer was applied to the Whatman #1 filter paper as a solution in an 80:20 (by weight) methanol/-water mixture. The solution contained 0.50% by weight of the polymer and 0.010% by weight of cobalt acetate tetrahydrate and was spray applied onto both sides of the paper. The application level was determined by calculation from the wet pick-up weight. The paper was then dried/cured at 105° C. for 10 minutes before being tested for wet strength in the manner outlined above.

TABLE I

| MACHINE DIRECTION WET STRENGTH IN gm/cm | | | | |
|---|---|---|---|---|
| Polymer of Example | 11.15 kilos/ metric ton | 22.3 kilos/ metric ton | 33.45 kilos/ metric ton | 44.6 kilos/ metric ton |
| (Control) | (91.1) | — | — | — |
| 1 | 591.2 | 816.2 | — | 750.1 |
| 2 | 576.9 | 831.9 | — | 958.9 |
| 3 | 131.4 | 198.2 | — | 303.6 |
| 4 | 519.7 | 718.0 | — | 819.8 |
| 5 | 573.3 | 937.3 | — | 1137.7 |
| 6 | 475.1 | 821.6 | — | 944.6 |
| 7 | 419.7 | 844/8 | — | 918.0 |
| 8 | 409.0 | 718.0 | 860.9 | 1125.2 |
| 9 | 291.1 | 719.8 | 1035.9 | 1168.4 |

From the above it can be seen that a very great improvement in wet strength is obtained by treating paper with the polymers of the invention even at comparatively modest levels of application. The only product showing modest improvement was that of Example 3 in which the presence of ethylene oxide apparently interferred with the formation of the blocks of unsaturated groups which are the central feature of the polymers of this invention.

All samples were generally much softer to the touch than samples treated with commercially available wet strength improvers tested at similar application levels and displayed at least comparable, and usually improved, wet strength performance.

EXAMPLE 11

This Example explores the effect of variations of the type and amount of metal salt used as an aid to the "drying" or curing of the polymer as reflected in the development of wet strength on application to a paper. The three polymers that were selected for the tests were those obtained in Examples 5, 8 and 9.

The methods of application, curing and testing are as described in Example 10. The metallic drier level is expressed in terms of the metal, not as the salt, as was the case in Example 10. The wet strengths obtained in each case are expressed in grams per centimeter and are averaged from four different runs. They are set forth below in Table II.

TABLE II

| | WET STRENGTH IN gm/cm | | | |
|---|---|---|---|---|
| | Applin. Level of Polymer - kilos/metric ton | | | |
| | 11.15 | 22.3 | 33.45 | 44.6 |
| Example 5 | | | | |
| 0.0025% of Co | | | | |
| Acetate | 930.5 | 957.3 | — | 1137.7 |
| Octoate | 784.1 | 1019.8 | 1059.1 | 1089.5 |
| 0.005% of Co | | | | |
| Acetate | 846.6 | 1135.9 | 1184.1 | 1223.4 |
| Octoate | 760.8 | 1155.5 | 1225.2 | 1262.7 |
| Example 8 | | | | |
| 0.0025% of Co | | | | |
| Acetate | 409.0 | 718.0 | 860.9 | 1125.2 |
| Octoate | 662.6 | 973.6 | 1139.5 | 1110.9 |
| 0.005% of Co | | | | |
| Acetate | 666.2 | 946.6 | 1094.8 | 1103.7 |
| Octoate | 860.9 | 1060.9 | 1152.0 | 1193.0 |
| Example 9 | | | | |
| 0.0025% of Co | | | | |
| Acetate | 291.1 | 826.9 | 1035.9 | 1148.4 |
| Octoate | 530.4 | 869.8 | 975.2 | 1098.4 |
| 0.005% of Co | | | | |
| Acetate | 448.3 | 1018.0 | 1071.6 | 1144.8 |
| Octoate | 737.6 | 1125.2 | 1198.4 | 1259.1 |

In this Table it can clearly be seen that the octoate is generally more effective at lower application levels though at higher levels the difference is not so marked.

EXAMPLE 12

In the following Example the effect of using cobalt octoate as the metallic drier was assessed using the polymer obtained from Examples 1, 2, 4, 6 and 7. In each case the treating solution contained the following proportions by weight.

| Polymer | 0.50% | |
|---|---|---|
| Solvent | 98.5% | of 80/20 (by weight of methanol/water |
| Metal Drier | 1.0% | of 0.50% Co (as the octoate) in acetone. |

The dry/cure time was 7 minutes at 120° C. or 10 minutes at 105° C.

In all other respects the procedures used were as set forth in Example 10.

The wet strengths obtained at various application levels are set forth in Table III below.

TABLE III

| | WET STRENGTHS IN gm/cm | | | | |
|---|---|---|---|---|---|
| Application Level kilos/ metric ton | Ex. 1 | Ex. 2 | Ex. 4 | Ex. 6 | Ex. 7 |
| 11.15 | 669.8 | 762.6 | 832.2 | 750.1 | 866.2 |
| 22.3 | 868.0 | 896.0 | 678.7 | 859.1 | 969.8 |
| 33.45 | 964.4 | 969.9 | 782.3 | 925.1 | 1012.7 |
| 44.6 | 996.4 | 1014.4 | 841.2 | 898.4 | 1009.8 |

From the above it can be seen that the biggest improvement is obtained in going from a 11.15 to a 22.3 kilos/metric ton level of application. Thereafter the increase in wet strength for the same increment amount of polymer used falls off rapidly.

EXAMPLE 23

This Example further explores the effect of increasing the amount of the metallic drier used. The polymer selected is that obtained in Example 9 and the treatment solutions are made up and used as set forth in Example 12 with the sole difference that the amount of cobalt octoate used is varied. The wet strengths of the treated substrates obtained which are averaged from four readings are set forth in Table IV below.

TABLE IV

| | WET STRENGTHS IN gm/cm | |
|---|---|---|
| Application Level in Kilos/metric ton | At 0.01% Co | At 0.0075% Co |
| 11.15 | 703.7 | 714.4 |
| 22.3 | 882.3 | 978.7 |
| 33.45 | 975.2 | 1008.0 |
| 44.6 | 1050.2 | 1185.9 |

From the above it can be seen that increasing the amount of the metallic drier beyond a certain level can actually be counterproductive.

EXAMPLE 14

In addition to giving great improvements in wet strength, it is found that the use of the polymers of the present invention markedly increases the dry strength of a paper substrate. This characteristic is demonstrated in the following experiment in which 0.50 gram of the polymer prepared in Example 8 was dissolved in 95.5 grams of a 80:20 weight ratio methanol/water mixture along with 1.0 gram of 1% cobalt acetate tetrahydrate.

The solution was sprayed onto both sides of a number of 12.5 cm. circles of Whatman #1 filter paper till a total of 1.10 gram of the above solution had been applied to each.

The treated papers were dried and cured for 7 minutes at 120° C. in a circulating air oven. Strips 2.54 cm. by 12.7 cm. were cut in the machine direction and tested on an Instron machine in the manner indicated above. The results are shown in Table V.

TABLE V

| Application Level in Kilos/metric ton | Dry Tensile Strengths in gm/cm. (average of 4) |
|---|---|
| 11.15 | 2429 |
| 22.3 | 2447 |
| 33.45 | 2572 |
| 44.6 | 2625 |
| 0 * | 2250 |
| 0 ** | 2482 |

* The control sample was water wetted then subjected to the same dry/cure cycle as was used for the treated samples. This shows that the polymer is also effective at maintaining and even increasing dry strength.
** This control sample was treated exactly as the previous control except that it was not wetted.

The following qualitative Examples explore the result of varying the drying conditions. The polymer used was that obtained in Example 1 and was tested for wet strength in the manner described above.

EXAMPLE 15

Drying the treated paper for two days at room temperature in the presence of a trace of a cobalt salt gave a product with good wet strength.

EXAMPLE 16

Drying the paper at 120° C. for 30 minutes in the absence of any metallic drier gave good wet strength but a drying time of 7 minutes under the same conditions was inadequate to develop any wet strength improvement.

EXAMPLE 17

If air is bubbled through the polymer in a glass vessel at room temperature for three days before it is applied to the paper, a drying time of 7 minutes at 120° C. is ineffective in developing good wet strength in the absence of a metallic drier.

However, if air is bubbled through the same polymer at room temperature for 1.5 days in the presence of a trace of cobalt salt and the polymer is applied as a methanol solution and dried for 7 minutes at 120° C., fairly good wet strength develops. Further, if the same air-treated polymer is applied with more cobalt salt in an acetone solution, the same drying conditions give excellent wet strength.

EXAMPLE 18

This Example shows that good wet strength can be developed if the polymer is allowed to cure at room temperature.

The polymer produced in Example 9 was emulsified in a toluene/water mixture containing 0.50% by weight cobalt in the form of the cobalt octoate salt. The emulsion contained 5% by weight of the polymer. This emulsion was stable even after standing for one month at room temperature.

The emulsion was then sprayed onto both sides of Whatman #1 filter paper to an application level of between 35 and 45 kilos/metric ton.

The papers were then allowed to dry in air at room temperature for 36 hours with free air circulating around them. The average of four evaluations of wet tensile strength was 1448 gm/cm.

This shows that emulsions of the polymers of the invention remain intact, stable and of high efficiency even after standing for prolonged periods at room temperature.

The Example also demonstrates that the polymer air-cures at room temperature if given sufficient exposure.

EXAMPLE 19

This Example demonstrates the use of the polymer in the form of an emulsion and the stability and effectiveness of such emulsions.

An emulsion was prepared containing the following components:

0.25 gram of an anhydrous sodium alkylbenzene sulfonate,
1.50 grams of toluene,
2.50 grams of the polymer produced in Example 9, and
4 drops of a 12% cobalt octoate solution.

The emulsion contained 56% by weight of the polymer and readily formed when the above components were hand shaken. When applied to a Whatman #1 filter paper at an application level of about 33.5 kg/metric ton and dried at 105° C. for 10 minutes in an air circulating oven, the paper showed a wet strength of 1375 gm/cm.

4.45 Grams of the above emulsifiable concentrate was emulsified with 45.55 grams of water in a Waring Blender metal cup for 1.0 minute at high speed to give a stable 5% emulsion which on application to a paper in the manner outlined above, gave a product with excellent wet strength at about the same level attained with the toluene emulsion.

After standing a month the emulsion was still stable and the wet strength developed in a paper treated in the same manner as described above had only dropped to 1286 gm/cm.

This Example shows clearly the stability of emulsions of the polymers of the invention, especially when stabilized by a surfactant, and their continued effectiveness in conferring wet strength over a prolonged period.

EXAMPLE 20

This Example describes a process for effecting the cationization of a polymer of the invention by reacting the polymer with a tertiary amine and thereby forming quaternary ammonium groups on the molecule.

The polymeric product of Example 9 (25 gm) was mixed with 6 drops (about 0.25 gm) 1f 1,3-bis(dimethylamino)-2-propanol in a glass vial. The resulting solution was clear and essentially colorless. The vial was then placed in a steam cone and heated at 100° C. for 48 hours. The reaction product was a slightly turbid, moderately viscous yellow oil which was methanol and acetone soluble — indicating that little or no crosslinking had occurred.

When acidified with glacial acetic acid the oil self-emulsified whereas the original polymer when shaken with twice its own volume of glacial acetic acid did not form an emulsion. This is taken to be evidence that the original resin which contained pendant chloromethyl groups had reacted with the tertiary amine to form quaternary ammonium sites that much improve the dispersibility of the polymer in water and which would if present in sufficient numbers render the polymer water soluble.

The quaternized polymer (2 drops) was mixed with an equal volume of an acetic acid, 3 ml. of methanol and 4 drops of a 1.0% aqueous solution of cobalt acetate tetrahydrate. The resulting solution was applied to a Whatman #1 filter paper, dried for 7 minutes at 120° C. and tested for wet strength on an Instron machine in the manner described above. The wet strength obtained was 1447 gm/cm.

EXAMPLE 21

This Example demonstrates the effect of the choice of solvent and the wet strength of the treated substrate.

The test procedure of Example 20 was repeated, using the same quaternized polymer, to evaluate a number of different solvent pairs. In each case the solvent pair was used to replace the 3 ml. of methanol used in Example 20. Wet strength evaluations were performed in the same fashion. In each case an emulsion was formed. The results are set out in Table VI below.

TABLE VI

| VARIATION OF WET STRENGTH WITH SOLVENT | |
|---|---|
| SOLVENT PAIR (Vol/Vol) | Wet Strength (gm/cm) |
| 30/70 - Methanol/Water | 1072 |
| 30/70 - Acetone/Water | 804 |
| 30/70 - Isobutanol/Water | 250 |
| 30/70 - Benzene/Water | 143 |
| 30/70 - Acetonitrile/Water | 1034 |

The above results show that hydrophilic organic solvents are needed to show the effectiveness of the quaternized polymers to the best advantage.

EXAMPLE 22

This Example shows the ability of the polymers of the present invention to dry and produce effective wet strength in the absence of metallic driers.

An emulsion of 2.5 gm of the polymer of Example 1 in 1.5 gm of toluene, 45.75 gm of deionized water and 0.25 gm of hexadecyltrimethylammonium bromide was obtained by charging the above components into a Waring Blender and mixing at high speed for 1 minute. The emulsion was stable, milky and fluid.

The emulsion was sprayed onto Whatman #1 filter paper at an application rate of 33.45 kg/metric ton. The filter papers were separately dried at 120° C. in an air circulating oven and tested on an Instron machine for wet strength in the manner described above. The results are set forth in Table VII and represent the average of four separate determinations.

TABLE VIII
VARIATION OF WET STRENGTH WITH DRYING TIME

| Time at 120° C. Minutes | Wet Strength gm/cm |
|---|---|
| 7 | 125 |
| 15 | 396 |
| 30 | 1229 |
| 60 | 1239 |
| [Control - no polymer. Dried for 30 minutes at 120° C. after water wetting] | 89 |

The above results show clearly that even in the absence of a metallic drier very good wet strength is developed after only a short drying time at elevated temperatures.

The above Examples are for the purposes of illustration only and should not be taken as implying any limitation on the scope of the present invention.

It is anticipated that many minor modifications and variations could be made in the invention described herein without changing the essential elements thereof and it is understood that all such modifications and variations are embraced within the purview of this invention.

What is claimed is:

1. A hydrophilic polymer having a backbone comprising at least two segments with the formula

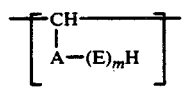

wherein A is a moiety terminating in the residue of an active hydrogen-containing group selected from the group consisting of alcoholic hydroxyl, thiol, amide, carboxylic acid and secondary amine with an active hydrogen atom removed, E is a moiety containing a radical having an activated olefinic unsaturation either $\alpha,\beta$ or $\beta,\gamma$ to the activating group, m is an integer and is at least 4.

2. The polymer of claim 1 in which A has the structure $-\!\!+\!(CH_2)_p-O\!\!+\!-$ wherein p has a value of from 0 to 3.

3. The polymer of claim 1 wherein the group E comprises a pendant allylic grouping.

4. The polymer of claim 1 wherein the group E comprises a pendant vinyl grouping.

5. The polymer of claim 1 in which up to half of the moieties E comprise a quaternary ammonium radical in addition to the activated olefinic unsaturation.

6. The polymer of claim 1 wherein m has a value that is from 4 to 20.

7. A hydrophilic polymer having the formula

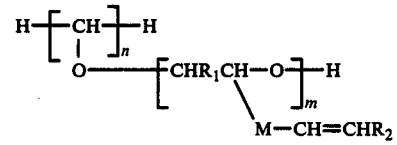

where n is an integer from 2 to 6, m is an integer from 4 to 10, M is either absent or a group capable of activating the adjacent double bond, and $R_1$ and $R_2$ are each hydrogen or $C_1$-$C_4$ alkyl groups.

8. A polymer according to claim 7 in which $R_1$ and $R_2$ are each hydrogen and M is a $-CH_2-O-CH_2-$ group.

9. A hydrophilic polymer having the empirical formula

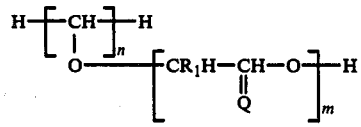

wherein n is an integer from 2 to 6, m is an integer from 6 to 10 and Q is a moiety with the empirical formula

wherein g is a fraction up to 0.5, Y is a halogen or a quaternary ammonium, sulfonium or phosphonium radical and $R_1$ and $R_2$ are each hydrogen or $C_1$ to $C_4$ alkyl groups.

10. A polymer according to claim 9 in which $R_1$ and $R_2$ are each hydrogen and Y is a quaternary ammonium radical.

11. A process for enhancing inter-fiber bonding in a fibrous substrate which comprises applying to the substrate a hydrophilic polymer having a backbone comprising at least one segment with the formula

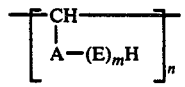

wherein A is a moiety terminating in the residue of an active hydrogen-containing group selected from the group consisting of alcoholic hydroxyl, amide, carboxylic acid and secondary amine with an active hydrogen atom removed, E is a moiety containing a radical having an activated olefinic unsaturation either $\alpha,\beta$ or $\beta,\gamma$ to the activating group, n is the number of adjacent, (as the term is hereinbefore defined), segments in the polymer having this formula, m is an integer, and m and n are at least one provided that where either is less than 4, the other is at least 4; and curing the polymer in the presence of oxygen.

12. A process according to claim 11 in which the polymer is applied to the substrate in the form of solution in a solvent comprising from 60 to 5% by volume of water and from 40 to 95% by volume of a water soluble alcohol, said solution containing from 0.2 to 50% by weight of the polymer.

13. A process according to claim 11 in which the polymer is applied to the substrate in the form of an aqueous emulsion containing from 0.2 to 50% by weight of the polymer.

14. A process according to claim 11 in which the polymer is cured in the presence of up to 4% by weight of the polymer of a metallic drier salt.

15. A process according to claim 11 in which the polymer is applied to the substrate at a rate of from 5 to 50 kilos per metric ton.

16. A process according to claim 11 in which the substrate is a cellulosic substrate.

17. A process according to claim 11 in which the polymer is one having the empirical formula:

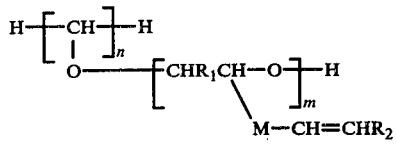

where n is an integer from 1 to 6, m is an integer from 4 to 10, M is either absent or a group capable of activating the adjacent double bond and $R_1$ and $R_2$ are each hydrogen or $C_1$-$C_4$ alkyl groups.

18. A process according to claim 11 in which the polymer is one having the empirical formula:

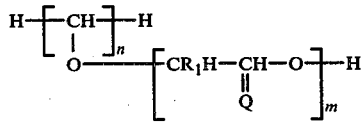

wherein n is an integer from 1 to 6, m is an integer from 6 to 10 and Q is a moiety with the empirical formula

wherein g is a fraction up to 0.5, Y is a halogen or a quaternary ammonium radical and $R_1$ to $R_2$ are each hydrogen or $C_1$ to $C_4$ alkyl groups.

19. A process for improving the wet strength of a paper substrate which comprises treating the substrate with from 15 to 30 kilograms per metric ton of substrate of a composition comprising a hydrophilic polymer having the formula

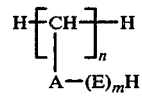

wherein A is a moiety terminating in the residue of an active hydrogen-containing group selected from the group consisting of alcoholic hydroxyl, amide, carboxylic acid and secondary amine with the active hydrogen atom removed, E is a moiety containing a radical having an activated olefinic unsaturation either $\alpha,\beta$ or $\beta,\gamma$ to the activating group, n is the number of adjacent, (as the term is hereinbefore defined), segments in the polymer having this formula; m is an integer, and m and n are at least one provided that where either is less than 4, the other is at least 4; said composition comprising the polymer and a methanol/water solvent in which the volume ratio of methanol to water is from 95:5 to 40:60 and the weight ratio of polymer to solvent is from 0.5:99.5 to 20:80.

20. A process according to claim 19 in which the polymer is present as an emulsion in the methanol/water solvent.

21. A process according to claim 19 in which the composition applied to the substrate contains from 0.001 to 0.01% by weight of a metallic drier salt.

22. A process for improving the wet strength of a paper substrate which comprises treating the substrate with from 15 to 30 kilos per metric ton of a hydrophilic polymer having the empirical formula

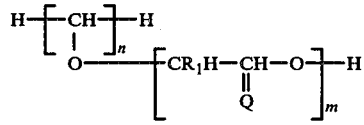

wherein n is an integer from 1 to 6, m is an integer from 6 to 10 and Q is a moiety with the empirical formula

wherein g is a fraction up to 0.5, Y is a halogen or a quaternary ammonium radical and $R_1$ and $R_2$ are each hydrogen or $C_1$ to $C_4$ alkyl groups; said polymer being added in the form of a composition comprising from 0.5 to 20% by weight of the polymer and from 99.5 to 80% by weight of a solvent comprising from 80 to 50% by volume of methanol and correspondingly from 20 to 50% by volume of water, said composition further containing from 0.001 to 0.01% by weight of a carboxylic acid salt of a metal selected from cobalt and manganese.

* * * * *

UNITED STATES PATENT AND TRADEMARK OFFICE
CERTIFICATE OF CORRECTION

PATENT NO. : 4,145,248
DATED : March 20, 1979
INVENTOR(S) : Donald N. Van Eenam

It is certified that error appears in the above-identified patent and that said Letters Patent are hereby corrected as shown below:

Page 1 of 3 pages

At Column 5, line 6, after "group" insert new paragraph: --- A typical polymer of this first type has the formula

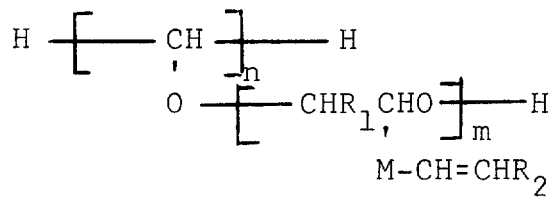

$$\text{M-CH=CHR}_2$$

where n is an integer which is preferably from 2 to 6; m is an integer which is preferably from 4 to 10, with the proviso that where either m or n is less than 4 the other is at least 4; M is either absent or a group capable of activating the adjacent double bond; and $R_1$ and $R_2$ are each hydrogen or $C_1$ to $C_4$ alkyl groups. ---

At Column 8, line 26, delete "5 to 50" and substitute --- 1 to 20 ---; and delete "10 to 30" and substitute --- 2 to 10 ---.

At Column 11, line 45, delete "80.05 mole)" and insert therefor --- (0.05 mole) ---.

At Column 12, line 45, delete "11.15" and substitute --- 2.5 ---; delete "22.3" and substitute --- 5.0 ---; delete "33.45" and substitute --- 7.5 ---; and delete "44.6" and substitute --- 10.0 ---.

At Column 13, line 20, delete "11.15" and substitute --- 2.5 ---; delete "22.3" and substitute --- 5.0 ---; delete "33.45" and substitute --- 7.5 ---; and delete "44.6" and sub- --- 10.0 ---.

UNITED STATES PATENT AND TRADEMARK OFFICE
CERTIFICATE OF CORRECTION

PATENT NO. : 4,145,248
DATED : March 20, 1979
INVENTOR(S) : Donald N. Van Eenam

It is certified that error appears in the above—identified patent and that said Letters Patent are hereby corrected as shown below:

Page 2 of 3 pages

At Column 13, line 64, delete "11.15" and substitute --- 2.5 ---; line 65, delete "22.3" and substitute --- 5.0 ---; line 66 delete "33.45" and substitute --- 7.5 ---; line 67, delete "44.6" and substitute --- 10.0 ---.

At Column 14, line 2, delete "11.15 to a 22.3" and substitute --- 2.5 to 5.0 ---.

At Column 14, line 6, delete "EXAMPLE 23" and substitute --- EXAMPLE 13 ---.

At Column 14, line 21, delete "11.15" and substitute --- 2.5 ---; line 22, delete "22.3" and substitute --- 5.0 ---; line 23, delete "33.45" and substitute --- 7.5 ---; and line 24, delete "44.6" and substitute --- 10.0 ---.

At Column 14, line 50, delete "11.15" and substitute --- 2.5 ---; line 51, delete "22.3" and substitute --- 5.0 ---; line 52, delete "33.45" and substitute --- 7.5 ---; and line 53, delete "44.6" and substitute --- 10.0 ---.

At Column 15, line 36, delete "35 and 45" and substitute --- 8 and 10 ---.

At Column 15, line 45, delete "33.5" and substitute --- 7.5 ---.

At Column 17, line 16, delete "33.5" and substitute --- 7.5 ---.

At Column 19, lines 18-19 delete "5 to 50" and substitute --- 1 to 20 ---.

UNITED STATES PATENT AND TRADEMARK OFFICE
CERTIFICATE OF CORRECTION

PATENT NO. : 4,145,248

DATED : March 20, 1979

INVENTOR(S) : Donald N. Van Eenam

It is certified that error appears in the above-identified patent and that said Letters Patent are hereby corrected as shown below:

At Column 19, line 59, delete "15 to 30" and substitute --- 2 to 10 ---.

At Column 20, line 32, delete "15 to 30" and substitute --- 2 to 10 ---.

Signed and Sealed this

Eleventh Day of September 1979

[SEAL]

Attest:

*Attesting Officer*

LUTRELLE F. PARKER

*Acting Commissioner of Patents and Trademarks*